US012575570B2

(12) United States Patent
Zhou

(10) Patent No.: US 12,575,570 B2
(45) Date of Patent: Mar. 17, 2026

(54) AQUEOUS COMPOSITION OF Epyrifenacil, Mesotrione AND Pyroxasulfone

(71) Applicant: Valent U.S.A. LLC, San Ramon, CA (US)

(72) Inventor: Ke Zhou, San Ramon, CA (US)

(73) Assignee: VALENT U.S.A., LLC, San Ramon, CA (US)

( * ) Notice: Subject to any disclaimer, the term of this patent is extended or adjusted under 35 U.S.C. 154(b) by 58 days.

(21) Appl. No.: 17/537,916

(22) Filed: Nov. 30, 2021

(65) Prior Publication Data

US 2022/0167622 A1 Jun. 2, 2022

Related U.S. Application Data

(60) Provisional application No. 63/120,235, filed on Dec. 2, 2020.

(51) Int. Cl.

*A01N 47/38* (2006.01)
*A01N 25/04* (2006.01)
*A01N 41/10* (2006.01)
*A01N 43/80* (2006.01)

(52) U.S. Cl.

CPC ............. *A01N 47/38* (2013.01); *A01N 25/04* (2013.01); *A01N 41/10* (2013.01); *A01N 43/80* (2013.01)

(58) Field of Classification Search

CPC ...................................................... A01N 47/38

See application file for complete search history.

(56) References Cited

U.S. PATENT DOCUMENTS

| | | | | |
|---|---|---|---|---|
| 2011/0065579 | A1* | 3/2011 | Sievernich | A01N 43/76 504/128 |
| 2012/0156262 | A1* | 6/2012 | Gutsche | A01N 43/56 514/4.5 |
| 2019/0200615 | A1* | 7/2019 | Tanuwidjaja | A01N 43/707 |
| 2019/0375725 | A1* | 12/2019 | Zhang | C07D 401/04 |
| 2020/0253209 | A1 | 8/2020 | Bristow | |

FOREIGN PATENT DOCUMENTS

| | | | | |
|---|---|---|---|---|
| WO | WO-9007276 | A2 * | 7/1990 | |
| WO | WO-2006003371 | A2 * | 1/2006 | A01N 61/00 |
| WO | WO-2020166477 | A1 * | 8/2020 | A01N 37/40 |

OTHER PUBLICATIONS https://www.azelis.com/en/markets/specialty-agrihorti/products/crop-protection/suspension-concentrates (Year: 2017).*
Wayback Archive for azelis.com (Year: 2017).*
Translated WO-2020166477-A1 (Year: 2020).*
Solvay Document (https://irp.cdn-website.com/3c9c85b1/files/uploaded/RHODOPOL%2B23.pdf) (Year: 2023).*
International Search Report and Written Opinion dated Jul. 1, 2022.

* cited by examiner

*Primary Examiner* — Andrew S Rosenthal
*Assistant Examiner* — Danielle Kim
(74) *Attorney, Agent, or Firm* — Wood, Phillips, Katz, Clark & Mortimer

(57) ABSTRACT

The present invention is directed to an aqueous composition comprising a mixture of epyrifenacil, mesotrione and pyroxasulfone. The present invention is further directed to methods of controlling weeds by applying the compositions of the present invention to a weed or an area in need of weed control.

14 Claims, No Drawings

AQUEOUS COMPOSITION OF Epyrifenacil, Mesotrione AND Pyroxasulfone

FIELD OF THE INVENTION

The present invention is directed to an aqueous composition comprising a mixture of epyrifenacil, mesotrione and pyroxasulfone. The present invention is further directed to methods of controlling weeds by applying the compositions of the present invention to a weed or an area in need of weed control.

BACKGROUND OF THE INVENTION

Unwanted plants, such as weeds, reduce the amount of resources available to crop plants and can have a negative effect on crop plant yield and quality. For example, a weed infestation reportedly was responsible for an 80% reduction in soybean yields. Bruce, J. A., and J. J. Kells, Horseweed (*Conyza Canadensis*) control in no-tillage soybeans (*Glycine max*) with preplant and preemergence herbicides, Weed Technol. 4:642-647 (1990). Therefore, controlling weeds is a major concern of crop growers. Unwanted plants in crop plant environments include broadleaves, grasses and sedges.

Epyrifenacil is a protoporphyrinogen oxidase ("PPO") inhibitor, that primarily controls broadleaf weeds. PPO inhibitors create highly toxic molecules upon contact with the weed that result in destruction of plant tissue. PPO inhibitors are also effective against some grasses. Epyrifenacil is difficult to formulate in aqueous compositions. Current methods include dissolving epyrifenacil in an organic solvent.

Mesotrione is an herbicide used to control broadleaf weeds in crop fields in both pre- and post-emergent settings. Mesotrione works by blocking an enzyme in the plants that breaks down tyrosine into components necessary for biosynthesis of certain molecules. Mesotrione has low water solubility. Mesotrione is commercially available as Callisto® and Tenacity®, available from and registered trademarks of Syngenta.

Pyroxasulfone is a relatively new isooxazoline herbicide that inhibits synthesis of very-long-chain fatty acids. Pyroxasulfone has very low water solubility. Pyroxasulfone is used to control weeds among many agricultural crops including corn and soybean.

These herbicides are likely to have compatibility issues when mixed together in an aqueous composition. However, aqueous compositions have many advantages including high flash point, low oil content, and low cost of packaging and transportation. In addition, these herbicides are not physically compatible with high electrolyte systems such as RoundUp Powermax® (available from Monsanto Technology LLC).

RoundUp Powermax® has become widely used in areas in need of weed control. For example, there are many varieties of agricultural crops, such as soybeans, corn, cotton and wheat that are resistant to Roundup Powermax® making its use to control weeds among these crops ideal. However, the significant increase in the area where glyphosate is applied leads to an increase in the potential infestation of glyphosate-resistance weeds. For controlling glyphosate-resistant weeds, Roundup Powermax® is often added to tank mixes of other herbicidal formulations having a different mode of action.

Thus, there is a need in the art for aqueous compositions containing epyrifenacil, mesotrione and pyroxasulfone that remain stable and that are compatible with high electrolyte systems.

SUMMARY OF THE INVENTION

In one embodiment, the present invention is directed to an aqueous composition comprising epyrifenacil, mesotrione and pyroxasulfone.

In another embodiment, the present invention is directed to an aqueous composition comprising epyrifenacil, mesotrione, pyroxasulfone and one or more excipients selected from the group consisting of one or more solvents, one or more surfactants, and one or more thickeners.

In another embodiment, the present invention is directed to a method of controlling a weed comprising applying a composition of the present invention to the weed or an area in need of weed control.

DETAILED DESCRIPTION OF THE INVENTION

Applicant discovered an aqueous composition that is stable despite containing three actives that have low to very low water solubility, namely epyrifenacil, mesotrione (160 ppm) and pyroxasulfone (3.49 ppm). Specifically, the Applicant discovered compositions capable of creating stable oil-in-water emulsion of epyrifenacil and stable suspension concentrates of mesotrione and pyroxasulfone that remain stable when combined in a final aqueous composition. Further, Applicant discovered aqueous compositions containing epyrifenacil, mesotrione and pyroxasulfone that are physically compatible with high electrolyte systems.

In one embodiment, the present invention is directed to an aqueous composition comprising epyrifenacil, mesotrione and pyroxasulfone.

Epyrifenacil is a protoporphyrinogen oxidase inhibitor having CAS #353292-31-6 and IUPAC name ethyl [(3-{2-chloro-5-[3,6-dihydro-3-methyl-2,6-dioxo-4-(trifluoromethyl)pyrimidin-1(2H)-yl]-4-fluorophenoxy}-2-pyridyl) oxy]acetate. Epyrifenacil has the following chemical structure:

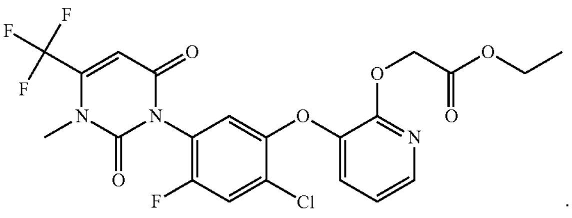 [SMILES: CCOC(=O)COc1ncccc1Oc1cc(-n2c(=O)cc(C(F)(F)F)n(C)c2=O)c(F)cc1Cl]

Epyrifenacil may be present in compositions of the present invention at a concentration from about 0.1% to about 10% w/w, preferably from about 0.5% to about 5% w/w, more preferably from about 0.5% to about 2% w/w and most preferably at about 1% w/w.

Mesotrione is a 4-hydroxypenylpuravate dioxygenase inhibitor having CAS #104206-82-8 and IUPAC name 2-(4-mesyl-2-nitrobenzoyl)cyclohexane-1,3-dione. Mesotrione has the following chemical structure:

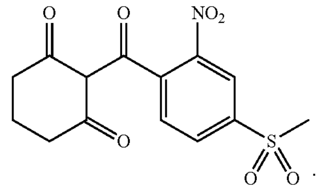 [SMILES: CS(=O)(=O)c1ccc(C(=O)C2C(=O)CCCC2=O)c([N+](=O)[O-])c1]

Mesotrione may be present in compositions of the present invention at a concentration from about 1% to about 20% w/w, preferably from about 5% to about 15% w/w, more preferably from about 10% to about 12% w/w and most preferably at about 11% w/w.

Pyroxasulfone is a very long chain fatty acid synthesis inhibitor having CAS #447399-55-5 and IUPAC name 3-[[5-(difluoromethoxy)-1-methyl-3-(trifluoromethyl)pyrazol-4-yl]methylsulfonyl]-5,5-dimethyl-4H-1,2-oxazole. Pyroxasulfone has the following chemical structure:

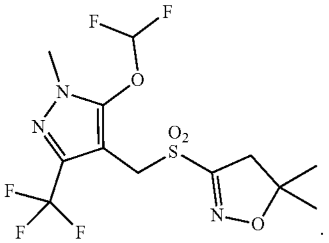 [SMILES: Cn1nc(C(F)(F)F)c(CS(=O)(=O)C2=NOC(C)(C)C2)c1OC(F)F]

Pyroxasulfone may be present in compositions of the present invention at a concentration from about 1% to about 10% w/w, preferably from about 2% to about 8% w/w, more preferably from about 4% to about 6% w/w and most preferably at about 5% w/w.

Compositions of the present invention contain water.

In a preferred embodiment, the aqueous compositions of the present invention are in the form of a suspo-emulsion. Suspo-emulsions are a mixture of water-insoluble active ingredients dispersed in an aqueous solution, where one (or more) of the active ingredients is in suspension form and one (or more) of the active ingredients is in emulsion form.

In another preferred embodiment, the particle size of the dispersed and emulsified microparticle in compositions of the present invention is within the range of about 10 μm or less, preferably from about 0.1 to about 10 and more preferably from about 0.2 to about 5 The particle size as described herein represents a volume median diameter. The volume median diameter is defined as a particle size at which a cumulative frequency is 50% on the volume basis in a frequency distribution and can be calculated by using a wet process on a laser diffraction particle size distribution analyzer. More specifically, a substance to be measured is dispersed into water and the particle size is then measured on the analyzer. Examples of the laser diffraction particle size distribution analyzer include Mastersizer 2000 (manufactured by Malvern Instruments).

In a more preferred embodiment, mesotrione and pyroxasulfone are in suspension form and hydrophobic organic solvent in which epyrifenacil is dissolved is in emulsion form.

In another preferred embodiment, the aqueous composition of the present invention has a pH from about 1 to about 7, preferably from about 1.5 to about 5, more preferably from about 2 to about 4 and most preferably at about 3 or 3.5.

In another preferred embodiment, compositions of the present invention further comprise one or more excipients selected from the group consisting of one or more solvents, one or more surfactants, and one or more thickeners.

Solvents suitable for use in compositions of the present invention include, but are not limited to, vegetable oils, esters, ketones, aromatic hydrocarbons, and paraffins. Vegetable oils include but are not limited to rapeseed oil, soybean oil, flaxseed oil, corn oil, and olive oil. Esters include but are not limited to benzyl acetate, diisobutyl adipate, diisodecyl adipate, butyl benzoate, dialkyl phthalate, octyl oleate, lauryl oleate, octyldodecyl oleate, and isopropyl myristate. Ketones include but are not limited to, methyl isobutyl ketone, heptanone, octanon, nonanone, cyclohexanone, and acetophenone. Aromatic hydrocarbons include, but are not limited to: alkylbenzenes including, but not limited to, toluene, xylene, ethylbenzene, octadecylbenzene, dialkylbenzenes and trialkylbenzenes; alkylnaphthalene including, but not limited to, methylnaphthalene, dimethylnaphthalene, dodecylnaphthalene and tridecylnaphthalene and phenylxysilylethane, 1-phenyl-1-ethylphenylethane. Paraffins include, but are not limited to, normal paraffin, isoparaffin, cycloparaffin, and liquid paraffin.

In a preferred embodiment, the one or more solvents is selected from the group consisting of heavy aromatic naphtha, a water-insoluble aromatic ester solvent, a morpholine amide of a C8,10 fatty acid and acetyl tributyl citrate.

The one or more solvents may be present in compositions of the present invention at a concentration from about 1% to about 30% w/w, preferably from about 10% to about 20% w/w, more preferably from about 14% to about 18% w/w and most preferably at about 16% w/w.

Surfactants suitable for use in compositions of the present invention include, but are not limited to, anionic surfactants and nonionic surfactants. Anionic surfactants include, but are not limited to, alkyl sulfate salts, polyoxyethylene alkylaryl ether sulfate salts, polyoxyethylene arylphenyl ether sulfate salts, naphthalene sulfonate salts and their formalin condensates; alkylnaphthalene sulfonate salts and their formalin condensates; phenyl sulfonate salts; dialkyl sulfosuccinate salts; acyl taurine salt; alkylphosphoric acid salts; polyoxyethylene alkyl ether phosphoric acid salts; polyoxyethylene arylphenyl ether phosphoric acid salts; and salts of styrene-maleic acid copolymer. Nonionic surfactants include, but are not limited to, polyoxyethylene-polyoxypropylene block copolymer, polyoxyethylene alkyl ether, polyoxyethylene aryl phenyl ether, sorbitan fatty acid ester, sucrose fatty acid ester, and alkyl polyglycoside.

In a preferred embodiment, the one or more surfactants is selected from the group consisting of an alkylphenol ethoxylate free nonionic wetter and dispersant package, an acrylic graft copolymer, a poly(ethylene oxide)-poly(propylene oxide)-poly(ethylene oxide) block copolymer having an average molecular weight of 5900 and a hydrophile weight percentage of 40%, a poly(ethylene oxide)-poly(propylene oxide)-poly(ethylene oxide) block copolymer having an average molecular weight of 3650 and a hydrophile weight percentage of 20%, calcium salt of 4-(4,6,8-trimethyl-3-nonanyl)benzenesulfate, a sorbitan monooleate ethoxylate, polyvinyl alcohol, an alkylphenol ethoxylate free nonionic wetter and dispersant package and PEG-10 tallate.

Commercially available representatives of surfactants of the present invention include but are not limited to: Atlox®

4894 (an alkylphenol ethoxylate free nonionic wetter and dispersant package available from Croda Americas LLC), Atlox® 4913 (a proprietary acrylic graft copolymer available from Croda Americas LLC) Pluronic® P104 (a poly (ethylene oxide)-poly(propylene oxide)-poly(ethylene oxide) block copolymer available from BASF Corporation), Pluronic® P104 has an average molecular weight of 5900 and a hydrophile weight percentage of 40%; Pluronic® L92 (a poly(ethylene oxide)-poly(propylene oxide)-poly(ethylene oxide) block copolymer available from BASF Corporation), Pluronic® L92 has an average molecular weight of 3650 and a hydrophile weight percentage of 20%, Toximul® SEE-341 (CAS #9005-65-6; a sorbitan monooleate ethoxylate available from Stepan), Ninate® 401-A (CAS #68953-96-8, 4-4,6,8-Trimethyl-3-nonanyl)benzenesulfate, calcium salt available from Stepan) and Ninex® MT-610 (CAS #61791-00-2; PEG-10 tallate available from Stepan).

The one or more surfactants may be present in compositions of the present invention at a concentration from about 1% to about 20% w/w, preferably from about 1% to about 10% w/w, more preferably from about 1% to about 7% w/w and most preferably at about 2%, 5% or about 7% w/w.

Thickeners suitable for use in the present invention include, but are not limited to, natural polysaccharides, cellulose derivatives, water-soluble synthetic polymers and mineral fine powders. Natural polysaccharides include, but are not limited to, xanthan gum, welan gum, gellan gum, guar gum, locust bean gum, arabic gum, carrageenan, pectin, and sodium alginate. Cellulose derivatives include, but are not limited to, methyl cellulose, carboxymethyl cellulose, carboxymethyl cellulose sodium, hydroxyethyl cellulose, hydroxypropyl cellulose, and hydroxypropyl methylcellulose. Water-soluble synthetic polymers include, but are not limited to, polyvinyl alcohol, polyvinylpyrrolidone, polyacrylate salts, and derivatives thereof. Mineral fine powders include, but are not limited to, colloidal hydrous aluminum silicate, colloidal hydrous magnesium silicate, aluminum magnesium silicate, and silica.

In a preferred embodiment, the one or more thickeners is selected from the group consisting of aluminum magnesium silicate, a xanthan gum, a guar gum, a hydroxypropyl guar.

The one or more thickeners may be present in compositions of the present invention at a concentration from about 0.01% to about 2% w/w, preferably from about 0.1% to about 1% w/w, more preferably from about 0.2% to about 0.4% w/w and most preferably at about 0.25% or 0.40% w/w.

In a more preferred embodiment, the present invention is directed to an aqueous composition comprising epyrifenacil, preferably at about 1% w/w, mesotrione, preferably at about 11% w/w, pyroxasulfone, preferably at about 5% w/w, an alkylphenol ethoxylate free nonionic wetter and dispersant package preferably from about 1% to about 7% w/w, an acrylic graft copolymer, preferably from about 2% to about 10% w/w, heavy aromatic naphtha, preferably at about 16% w/w, a poly(ethylene oxide)-poly(propylene oxide)-poly (ethylene oxide) block copolymer having an average molecular weight of 3650 and a hydrophile weight percentage of 20%, preferably at about 2% w/w, xanthan gum, preferably at about 0.25% w/w and water and optionally comprising, a silicone-based antifoaming agent, preferably at about 0.2% w/w, magnesium aluminum silicate, preferably at about 0.4% w/w, 19.3% 1,2-benzisothiazolin-3-one, preferably at about 0.4% w/w and propylene glycol, preferably at about 5% w/w.

In a most preferred embodiment, the present invention is directed to an aqueous composition comprising:

about 1.05% w/w epyrifenacil;
about 11.1% w/w mesotrione;
about 4.77% w/w pyroxasulfone;
about 16.07% w/w heavy aromatic naphtha;
about 7.0% w/w of an alkylphenol ethoxylate free nonionic wetter and dispersant package;
about 2.0% w/w of an acrylic graft copolymer;
about 0.20% w/w of a silicone-based antifoaming agent;
about 0.40% w/w magnesium aluminum silicate;
about 0.40% w/w of 19.3% 1, 2-benzisothiazolin-3-one;
about 5.0% w/w propylene glycol;
about 2.0% w/w of a poly(ethylene oxide)-poly(propylene oxide)-poly(ethylene oxide) block copolymer having an average molecular weight of 3650 and a hydrophile weight percentage of 20%;
about 0.25% w/w xanthan gum; and
water.

In another most preferred embodiment, the present invention is directed to an aqueous composition comprising:

about 1.05% w/w epyrifenacil;
about 11.1% w/w mesotrione;
about 4.77% w/w pyroxasulfone;
about 16.07% w/w heavy aromatic naphtha;
about 1.0% w/w of an alkylphenol ethoxylate free nonionic wetter and dispersant package;
about 10.0% w/w of an acrylic graft copolymer;
about 0.20% w/w of a silicone-based antifoaming agent;
about 0.40% w/w magnesium aluminum silicate;
about 0.40% w/w of 19.3% 1, 2-benzisothiazolin-3-one;
about 5.0% w/w propylene glycol;
about 2.0% w/w of a poly(ethylene oxide)-poly(propylene oxide)-poly(ethylene oxide) block copolymer having an average molecular weight of 3650 and a hydrophile weight percentage of 20%;
about 0.25% w/w xanthan gum; and
water.

In another embodiment, the present invention is directed to methods of controlling weeds comprising applying a composition of the present invention to the weeds or an area in need of weed control.

In another preferred embodiment, the compositions of the present invention may be applied sequentially or concurrently with glyphosate, glufosinate, dicamba, 2,4-D and mixtures thereof to control weeds.

The compositions of the present invention can be applied to any environment in need of weed control. The environment in need of weed control may include any area that is desired to have a reduced number of weeds or to be free of weeds. For example, the composition can be applied to an area used to grow crop plants, such as a field, orchard, or vineyard. For example, compositions and methods of the present invention can be applied to areas where soybeans, corn, peanuts, and cotton are growing. In a preferred embodiment, the composition is applied in an area where a broadleaf crop (soybean, cotton, peanut, orchard, vineyard, forages) is growing. The compositions of the present invention can also be applied to non-agricultural areas in need of weed control such as lawns, golf courses, or parks.

The compositions of the present invention can be applied by any convenient means. Those skilled in the art are familiar with the modes of application that include foliar applications such as spraying, chemigation (a process of applying the composition through the irrigation system), by granular application, or by impregnating the composition on fertilizer.

The compositions of the present invention can be prepared as concentrate formulations or as ready-to-use formulations. The compositions can be tank mixed.

The compositions and methods of the present invention can be applied successfully to crop plants and weeds that are resistant to glyphosate, glufosinate, or other herbicides. The composition and methods can also be applied to areas where genetically modified crops ("GMOs") or non-GMO crops are growing. The term "GMO crops" as used herein refers to crops that are genetically modified.

The compositions and methods of the present invention may be used for pre-emergence control of weeds.

The compositions and methods of the present invention may be used to increase the speed of glyphosate control of weeds during post-emergence application.

The compositions and methods of the present invention may be used to increase the speed of glyphosate control of weeds during a burn-down application.

As used herein "burn-down" refers to applying a pesticide to weeds post-emergence but prior to emergence of crops.

Throughout the application, the singular forms "a," "an," and "the" include plural reference unless the context clearly dictates otherwise.

As used herein, all numerical values relating to amounts, weight percentages and the like are defined as "about" or "approximately" each particular value, plus or minus 10%. For example, the phrase "at least 5.0% by weight" is to be understood as "at least 4.5% to 5.5% by weight." Therefore, amounts within 10% of the claimed values are encompassed by the scope of the claims.

These representative embodiments are in no way limiting and are described solely to illustrate some aspects of the invention.

Further, the following examples are offered by way of illustration only and not by way of limitation.

EXAMPLES

Example 1—Preparation of Aqueous Composition of the Present Invention

Method

Mesotrione and pyroxasulfone were mixed together in a formulation containing Atlox® 4894 and 4913, Xiameter® AFE 0300, Veegum® R, Proxel® GXL, propylene glycol and water to form a suspension concentrate composition. Epyrifenacil was dissolved in aromatic 200ND in the presence of Pluronic® L92 and water to form an emulsion-in-water composition. The suspension concentrate formulation and emulsion-in-water composition were then homogenized at a near 1:1 (12:13) ratio in the presence of Rhodopol® 50 MC and additional water to form a suspo-emulsion.

Results

The suspo-emulsion was physically and chemically stable as seen in Examples 8 and 9, below. Further, the suspo-emulsion was physically compatible with high electrolyte systems as seen in Example 7, below.

Example 2—Selection of Surfactant

TABLE 1

| Composition (% w/w) | A | B | C | D |
|---|---|---|---|---|
| Mesotrione (99.8%) | 11.43 | 11.43 | 11.43 | 11.43 |
| Pyroxasulfone (99.5%) | 4.93 | 4.93 | 4.93 | 4.93 |
| Epyrifenacil (98%) | 1.08 | 1.08 | 1.08 | 1.08 |
| Aromatic 200ND | 16.2 | 16.2 | 16.2 | 16.2 |
| Xiameter ® AFE 0300 | 0.2 | 0.2 | 0.2 | 0.2 |
| Veegum ® R | 0.25 | 0.25 | 0.25 | 0.25 |
| Proxel ® GXL | 0.2 | 0.2 | 0.2 | 0.2 |
| Propylene glycol | 5.0 | 5.0 | 5.0 | 5.0 |
| Pluronic ® P-104 | 2.0 | 2.0 | — | — |
| Toximul ® TA-15 | — | — | 2.0 | 2.0 |
| Atlox ® 4894 | 1.0 | — | 1.0 | — |
| Atlox ® 4913 | 2.0 | — | 2.0 | — |
| Soprophor ® FLK | — | 6.0 | — | 6.0 |
| Water | Q.S. | Q.S. | Q.S. | Q.S. |
| Total | 100 | 100 | 100 | 100 |

Aromatic 200ND (CAS # 64742-94-5) is heavy aromatic naphtha available from Exxon-Mobil.
Xiameter ® AFE 0300 is a silicone-based antifoaming agent available from Dow Corning Corporation.
Veegum ® R (CAS #1302-78-9 or #12199-37-0) is magnesium aluminum silicate available from Vanderbilt Minerals, LLC.
Proxel ® GXL is 19.3% 1,2-benzisothiazolin-3-one available from Lonza.
Pluronic ® P104 is a poly(ethylene oxide)-poly(propylene oxide)-poly(ethylene oxide) block copolymer and is available from BASF Corporation. Pluronic ® P104 has an average molecular weight of 5900 and a hydrophile weight percentage of 40%.
Toximul ® TA-15 (CAS # 61791-26-2) is tallow amine ethoxylate available from Stepan.
Atlox ® 4894 is an alkylphenol ethoxylate free nonionic wetter and dispersant package available from Croda Americas LLC.
Atlox ® 4913 is a proprietary acrylic graft copolymer available from Croda Americas LLC.
Soprophor ® FLK is tristyrylphenol ethoxylated available from Rhodia Chimie Societe Par Actions Simplifiee.

Methods

Compositions A-D from Table 1, above, were formulated and mixed. Compositions B and D were not homogenous following mixing. Compositions A and C were homogenous following mixing and remained homogenous for several days at room temperature. Thus, Atlox® 4913 and 4894 demonstrated superior stabilization to Soprophor® FLK.

Example 3—Selection of Solvent 7 formulations containing 20% w/w epyrifenacil and seven different solvents were placed at room temperature for 24 hours and assayed for epyrifenacil concentration. These seven solvents were then formulated with mesotrione at roughly 0.5%, 1.0% and 1.5% w/w and assayed for mesotrione concentration after 40° C. overnight or 50° C. overnight. Results of these studies are found in Table 2, below.

TABLE 2

| | Epyrifenacil | Mesotrione Assay (% w/w) | | |
|---|---|---|---|---|
| | Assay (% | 40° C. Overnight | | 50° C. Overnight |
| Solvent | w/w) | Input | Assay | Assay |
| Jeffsol ® AG 1700 | 12.9% | 0.50% | 0.343% # | — |
| | | 0.99% | # | 0.422% # |
| | | 1.47% | # | # |
| Jeffsol ® AG 1730 | 18.4% | 0.60% | 0.265% # | — |
| | | 1.09% | # | 0.513% # |
| | | 1.47% | # | # |

TABLE 2-continued

| Solvent | Epyrifenacil Assay (% w/w) | Mesotrione Assay (% w/w) 40° C. Overnight Input | 40° C. Overnight Assay | 50° C. Overnight Assay |
|---|---|---|---|---|
| Jeffsol ® AG 1705 | 18.4% | 0.50% | 0.521% Dissolved | — |
| | | 0.99% | Trace | Dissolved |
| | | 1.48% | # | Dissolved |
| Hallcomid ® M-8-10 | 15.4% | 0.59% | 0.576% # | — |
| | | 0.99% | # | Dissolved |
| | | 1.47% | # | 1.37% Trace |
| Aromatic 200ND | 17.8% | 0.50% | 0.289% # | — |
| | | 1.08% | # | 0.318% # |
| | | 1.57% | # | # |
| Citroflex ® A-4 | 9.16% | 0.50% | 0% # | — |
| | | 0.99% | # | 0% |
| | | 1.38% | # | # |
| Hi-Sol ® 15 | 6.86% | 0.59% | 0% # | — |
| | | 1.08% | # | 0% # |
| | | 1.57% | # | # |

# denotes precipitate formation

Jeffsol ® AG 1700 is a water-insoluble aromatic ester solvent available from Huntsman Corporation. Jeffsol ® AG 1700 has a flash point of 106° C., a boiling point of 249° C., a freezing point of −22° C. and a density of 1.01 g/mL.

Jeffsol ® AG 1730 is a morpholine amide of a C8, 10 fatty acid available from Huntsman Corporation.

Jeffsol ® AG 1705 is benzyl acetate available from Huntsman Corporation.

Hallcomid ® M-8-10 (CAS # 1118-92-9 and 14433-76-2) is [N, N-dimethyloctanamide (N, N-dimethylcaprylamide) and N, N-dimethyldecanamide (N, N-dimethylcapramide) available from Stepan.

Citroflex ® A-4 (CAS # 77-90-7) is acetyl tributyl citrate available from Vertellus.

Hi-Sol ® 15, also known as Aromatic 150 (CAS # 64742-94-5, 91-20-3 and 95-63-6) is a solvent naphtha containing naphthalene and 1,2,4-trimethylbenzene available from Ashland.

As seen in Table 2, above, Jeffsol® AG 1700, 1730, Aromatic 200ND and Citroflex® A-4 were capable of solubilizing a high concentration of epyrifenacil and provided little to no solubilization of mesotrione. Thus, each of Jeffsol® AG 1700, 1730, Aromatic 200ND and Citroflex® A-4 were selected to test in combination with a variety of emulsifiers in Example 4, below.

Example 4—Selection of Emulsifier

TABLE 3

| Composition (% w/w) | E | F | G | H | I | J | K | L | M |
|---|---|---|---|---|---|---|---|---|---|
| Mesotrione (99.8%) | 11.43 | 11.43 | 11.43 | 11.43 | 11.43 | 11.43 | 11.43 | 11.43 | 11.43 |
| Pyroxasulfone (99.5%) | 4.93 | 4.93 | 4.93 | 4.93 | 4.93 | 4.93 | 4.93 | 4.93 | 4.93 |
| Epyrifenacil (98%) | 1.08 | 1.08 | 1.08 | 1.08 | 1.08 | 1.08 | 1.08 | 1.08 | 1.08 |
| Aromatic 200ND | 16.2 | 16.2 | 16.2 | 16.2 | 16.2 | 16.2 | 16.2 | 16.2 | 16.2 |
| Xiameter ® AFE 0300 | 0.2 | 0.2 | 0.2 | 0.2 | 0.2 | 0.2 | 0.2 | 0.2 | 0.2 |
| Veegum ® R | 0.25 | 0.25 | 0.25 | 0.25 | 0.25 | 0.25 | 0.25 | 0.25 | 0.25 |
| Proxel ® GXL | 0.2 | 0.2 | 0.2 | 0.2 | 0.2 | 0.2 | 0.2 | 0.2 | 0.2 |
| Propylene glycol | 5.0 | 5.0 | 5.0 | 5.0 | 5.0 | 5.0 | 5.0 | 5.0 | 5.0 |
| Atlox ® 4894 | 1.0 | 1.0 | 1.0 | 1.0 | 1.0 | 1.0 | 1.0 | 1.0 | 1.0 |
| Atlox ® 4913 | 2.0 | 2.0 | 2.0 | 2.0 | 2.0 | 2.0 | 2.0 | 2.0 | 2.0 |
| Pluronic ® P-104 | 2.0 | — | — | — | — | — | — | — | — |
| Ninate ® 401-A | — | 2.0 | — | — | — | — | — | — | — |
| Toximul ® SEE-341 | — | — | 2.0 | — | — | — | — | — | — |
| Atlox ® 4894 | — | — | — | 2.0 | — | — | — | — | 2.0 |
| Polyvinyl alcohol | — | — | — | — | 2.0 | — | — | 2.0 | 2.0 |
| Ninex ® MT-610 | — | — | — | — | — | 2.0 | — | — | — |
| Pluronic ® L92 | — | — | — | — | — | — | 2.0 | 2.0 | — |
| Water | Q.S. | Q.S. | Q.S. | Q.S. | Q.S. | Q.S. | Q.S. | Q.S. | Q.S. |
| Total | 100 | 100 | 100 | 100 | 100 | 100 | 100 | 100 | 100 |

Ninate ® 401-A (CAS # 68953-96-8) is 4-(4,6,8-Trimethyl-3-nonanyl)benzenesulfate, calcium salt available from Stepan.

Toximul ® SEE-341 (CAS # 9005-65-6) is a sorbitan monooleate ethoxylate available from Stepan.

Ninex ® MT-610 (CAS # 61791-00-2) is PEG-10 tallate available from Stepan.

Pluronic ® L92 is a poly(ethylene oxide)-poly(propylene oxide)-poly(ethylene oxide) block copolymer available from BASF Corporation. Pluronic ® L92 has an average molecular weight of 3650 and a hydrophile weight percentage of 20%.

Method

Compositions E-M from Table 7, above, were mixed and homogenized. Compositions E-M were then subjected to freeze/thaw cycles for 2 weeks and 2 weeks at 54° C. Particle size distribution and sprayability were measured prior to storage and at 2 weeks. Results of these studies are found in Table 4, below.

Sprayability

Sprayability is based on the following test procedure and calculation. A 100-mesh (150 micrometer) sieve is weighed and the weight is recorded as the tare weight ("W0"). The sieve is then placed over a wide mouth jar.

50 grams of a composition ("W") is weighed and added to 600 milliliters of tap water, the composition was then stirred for approximately two minutes to create a dispersion.

The entire dispersion was poured through the sieve followed by rinsing. Rinsing was done using tap water at a flow rate at about 1.5 liters per minute for one minute. The sieve with the residue was then placed in a drying oven and dried to create the dry sieve with the residue ("W1"). Percent sprayability was then calculated with the following equation: (W1−W0)/W*100.

A large percent sprayability indicates poor formulation stability leading to nozzle clogging during field application. Formulation should have a sprayability no more than 0.05% w/w under all conditions.

Physical Stability

Physical stability is determined by particle size. Particle sizes were measured for each composition. $D_{50}$ and $D_{90}$ values were measured and are reported below in Table 4. D50 denotes the proportion of particles whose diameter measured below the given value in microns. D90 denotes the proportion of particles whose diameter measured below the given value in microns.

TABLE 4

| | Initial | | Freeze/Thaw (2 weeks) | | | 54° C. (2 weeks) | | |
|---|---|---|---|---|---|---|---|---|
| Comp. | D50 | D90 | D50 | D90 | Sprayability | D50 | D90 | Sprayability |
| E | 1.305 | 7.371 | 1.419 | 5.471 | 0.0080% | 1.944 | 17.758 | 0.0120% |
| F | 1.959 | 4.823 | 2.057 | 5.216 | 0.0042% | 1.715 | 6.165 | 0.0230% |
| G | 1.691 | 6.627 | 1.453 | 37.571 | 0.0014% | 1.417 | 12.564 | 0.0188% |
| H | 6.633 | 12.075 | 6.416 | 12.486 | 0.0057% | 6.326 | 14.044 | 0.0015% |
| I | 3.267 | 8.900 | 1.372 | 5.550 | 0.0004% | 1.728 | 11.032 | 0.0444% |
| J | 1.462 | 4.554 | 1.620 | 5.732 | 0.0000% | 1.655 | 16.396 | 0.0031% |
| K | 1.473 | 3.875 | 1.458 | 5.717 | 0.0021% | 2.101 | 9.817 | 0.0021% |
| L | 1.397 | 3.275 | 1.730 | 4.014 | 0.0022% | 1.810 | 4.464 | 0.0025% |
| M | 1.045 | 3.346 | 1.343 | 4.127 | 0.0043% | 2.156 | 9.754 | 0.0107% |

Results

As seen in Table 4, all emulsifiers provided good physical stability and sprayability. However, Compositions E, K, L and M provided the best physical stability and were subjected to further stability tests in Example 5, below.

Example 5—Storage Stability of Select Compositions

Method

Compositions E, K, L and M were subjected to further stability tests. Specifically, each composition was subjected to freeze/thaw cycles for 1 month, 2 weeks at 54° C., 2 months at 50° C. and 4 months at 40° C. Syneresis, bottom clear time, pH, sprayability, dispersibility, re-dispersibility, particle size, suspensibility and viscosity were measured prior and following each storage. Results of these studies are found in Tables 5-8, below.

Syneresis

Syneresis was determined by placing the composition in a 125-milliliter high density polyethylene (HDPE) bottle at the above-mentioned storage conditions. The height of the top clear liquid phase was then measured. Syneresis is calculated using the following equation: Height of top clear liquid phase/height of total sample.

A high syneresis value indicates poor formulation stability.

Bottom Clear Time

Bottom clear time is the time until the composition flows away from the container bottom when 62.5 milliliters of the composition is placed in a 125-milliliter plastic jar and placed on its side. A high bottom clear time indicates poor flowability stability.

Dispersibility

Dispersibility was measured by adding one milliliter of a composition to a 100-milliliter graduated cylinder containing 99 milliliters of 324 parts per million hard water. The cylinder was then run through cycles of inversion and reversion with one complete cycle every 2 seconds. Dispersibility is the number of cycles it takes to disperse the formulation uniformly. A high dispersibility value indicates poor formulation stability.

Re-dispersibility

After the dispersibility test is done, the dispersed formulation was undisturbed for 24 hours. The cylinder was then run through cycles of inversion and reversion with one complete cycle every two seconds. Re-dispersibility is the number of cycles it takes to disperse the formulation uniformly after sitting. A high redispersibility value indicates poor formulation stability.

Suspensibility

Suspensibility is based on the following test procedure and calculation. One gram of a composition ("W") was added to 50 milliliters of tap water in a beaker and left undisturbed until the composition was thoroughly wet. Once wet the composition was stirred for approximately two minutes to create a dispersion.

The entire dispersion was transferred into a 100-milliliter graduated cylinder. The cylinder was then filled to the 100-milliliter mark using 324 parts per million hard water. The cylinder was run through 30 cycles of inversion and reversion with one complete cycle every two seconds. The graduated cylinder was then left undisturbed for 30 minutes. Following rest, the top 90 milliliters were removed from the cylinder using a vacuum apparatus. The remaining 10 milliliters of material was then transferred into a tared evaporation dish ("W0"). The dish with the material was placed in a drying oven and dried to a constant weight ("W1"). Percent suspensibility was calculated using the following equation: ((W*A/100)−(W1−W0))*111/(W*A/100), wherein A=percentage of solid content in the sample (determined from the formulation of the composition).

A low percent suspensibility indicates poor formulation stability leading to precipitation of the composition.

Rheology Properties

The rheological properties including viscosity, G', G" was measured using Haak Mars Modular Advanced Rheometer System made by Thermo Scientific, model number: MARS 2.

TABLE 5

| Comp. E | Initial | 54° C. (2 weeks) | Freeze/Thaw (1 month) | 50° C. (2 months) | 40° C. (4 months) |
|---|---|---|---|---|---|
| Syneresis | — | 2.37% | 3.57% | 7.14% | 3.57% |
| Bottom Clear Time (s) | — | 2 | 2 | 1 | 1 |
| pH | 4.82 | 4.73 | 4.87 | 4.51 | 4.41 |
| Sprayability | 0.0024% | 0.0033% | 0.0015% | 0.001% | 0.004% |
| Dispersibility | 4 | 3 | 9 | 5 | 3 |
| Re-Dispersibility | 9/20 | 5/10 | 5/11 | 8/20 | 3/15 |
| D10 | 0.693 | 0.864 | 0.64 | 0.978 | 0.782 |
| D50 | 1.953 | 2.705 | 1.96 | 2.894 | 2.774 |
| D90 | 8.149 | 14.235 | 27.471 | 14.107 | 11.01 |
| Suspensibility | 87.15% | 89.40% | 84.26% | 93.02% | 93.56% |
| Viscosity at shear rate 1 $S^{-1}$ (mPa) | 3474 | 3474 | 3219 | 2395 | 2808 |
| Viscosity at shear rate 50 $S^{-1}$ (mPa) | 185 | 185 | 198 | 189.1 | 201.1 |
| G' (t = 0.1 Pa) | 15.6 | 15.6 | 14.6 | 13.5 | 13.64 |
| G" (t = 0.1 Pa) | 5.3520 | 5.3520 | 5.5340 | 5.835 | 5.8 |
| G'/G" | 2.91 | 2.91 | 2.64 | 2.3136 | 2.3517 |

TABLE 6

| Comp. K | Initial | 54° C. (2 weeks) | Freeze/ Thaw (1 month) | 50° C. (2 months) | 40° C. (4 months) |
|---|---|---|---|---|---|
| Syneresis | — | 7.14% | 2.38% | 7.14% | 11.69% |
| Bottom Clear Time (s) | — | 1 | 1 | 1 | 1 |
| pH | 4.76 | 4.76 | 4.79 | 4.52 | 4.55 |
| Sprayability | 0.004% | 0.0002% | 0.0006% | 0.0004% | 0.002% |
| Dispersibility | 4 | 3 | 3 | 5 | 2 |
| Re-Dispersibility | 12/39 | 21/>80 | 4/14 | 24/51 | 17/52 |
| D10 | 0.698 | 0.683 | 0.862 | 0.697 | 0.655 |
| D50 | 1.445 | 1.763 | 1.848 | 1.652 | 1.438 |
| D90 | 3.183 | 4.783 | 4.143 | 4.477 | 3.972 |
| Suspensibility | 98.49% | 95.07% | 94.55% | 94.17% | 94.16% |
| Viscosity at shear rate 1 $S^{-1}$ (mPa) | 1500 | 1032 | 1220 | 743.9 | 1050 |
| Viscosity at shear rate 50 $S^{-1}$ (mPa) | 93.2 | 91.81 | 85.19 | 71.46 | 84.0 |
| G' (t = 0.1 Pa) | 6.435 | 15.19 | 4.022 | 3.173 | 2.165 |
| G" (t = 0.1 Pa) | 2.507 | 15.9 | 1.844 | 2.483 | 1.612 |
| G'/G" | 2.57 | 0.96 | 2.18 | 1.28 | 1.34 |

TABLE 7

| Comp. L | Initial | 54° C. (2 weeks) | Freeze/ Thaw (1 month) | 50° C. (2 months) | 40° C. (4 months) |
|---|---|---|---|---|---|
| Syneresis | — | 1.64% | 3.57% | 3.33% | 0% |
| Bottom Clear Time (s) | — | 1 | 1 | 1 | 2 |

TABLE 7-continued

| Comp. L | Initial | 54° C. (2 weeks) | Freeze/ Thaw (1 month) | 50° C. (2 months) | 40° C. (4 months) |
|---|---|---|---|---|---|
| pH | 4.80 | 4.70 | 4.88 | 4.49 | 4.5 |
| Sprayability | 0.0051% | 0.0024% | 0.0018% | 0.003% | 0.009% |
| Dispersibility | 4 | 5 | 6 | 4 | 6 |
| Re-Dispersibility | 12/50 | 18/40 | 3/7 | 41/>60 | 59/62* |
| D10 | 0.587 | 0.725 | 0.872 | 0.591 | 0.56 |
| D50 | 1.324 | 1.655 | 1.89 | 1.47 | 1.389 |
| D90 | 4.059 | 5.518 | 5.481 | 5.658 | 7.532 |
| Suspensibility | 90.83% | 90.63% | 88.94% | 97.22% | 97.15% |

TABLE 7-continued

| Comp. L | Initial | 54° C. (2 weeks) | Freeze/ Thaw (1 month) | 50° C. (2 months) | 40° C. (4 months) |
|---|---|---|---|---|---|
| Viscosity at shear rate 1 $S^{-1}$ (mPa) | 3212 | 3212 | 3174 | 1899 | — |
| Viscosity at shear rate 50 $S^{-1}$ (mPa) | 169.6 | 169.6 | 181.7 | 158.9 | — |
| G' (t = 0.1 Pa) | 11.88 | 11.88 | 10.94 | 5.854 | — |
| G" (t = 0.1 Pa) | 3.966 | 3.966 | 3.831 | 2.839 | — |
| G'/G" | 3.00 | 3.00 | 2.86 | 2.06 | — |

*denotes large clumps on screen that penetrated screen following rinsing with tap water.

TABLE 8

| Comp. M | Initial | 54° C. (2 weeks) | Freeze/ Thaw (1 month) | 50° C. (2 months) | 40° C. (4 months) |
|---|---|---|---|---|---|
| Syneresis | — | 1.82% | 10.34% | 6.90% | 0% |
| Bottom Clear Time (s) | — | 1 | 1 | 1 | 1 |
| pH | 4.78 | 4.69 | 4.85 | 4.47 | 4.46 |
| Sprayability | 0.0033% | 0.0004% | 0.0023% | 0.007% | 0.005% |
| Dispersibility | 5 | 4 | 11 | 5 | 5 |
| Re-Dispersibility | 11/62 | 18/29 | 11/29 | 16/25 | 20/41** |
| D10 | 0.473 | 0.543 | 0.499 | 0.493 | 0.539 |
| D50 | 1.366 | 1.746 | 1.382 | 1.960 | 1.838 |

TABLE 8-continued

| Comp. M | Initial | 54° C. (2 weeks) | Freeze/ Thaw (1 month) | 50° C. (2 months) | 40° C. (4 months) |
|---|---|---|---|---|---|
| D90 | 11.353 | 12.259 | 16.57 | 14.161 | 10.64 |
| Suspensibility | 85.93% | 89.89% | 90.83% | 94.60% | 94.35% |
| Viscosity at shear rate 1 $S^{-1}$ (mPa) | 4101 | 4101 | 4047 | 1799 | 3099 |
| Viscosity at shear rate 50 $S^{-1}$ (mPa) | 208.2 | 208.2 | 215.9 | 139.7 | 204.6 |
| G' (t = 0.1 Pa) | 22.99 | 22.99 | 20.31 | 8.854 | 17.12 |
| G" (t = 0.1 Pa) | 6.986 | 6.986 | 6.532 | 4.249 | 6.41 |
| G'/G" | 3.29 | 3.29 | 3.11 | 2.0838 | 2.6708 |

**denotes large clumps on screen that did not penetrate screen following rinsing with tap water.

As seen in Tables 5-8, Compositions E, L and M demonstrated the best physical stability.

Example 6—Selection of Thickener

TABLE 9

| Composition (% w/w) | N | O | P | Q | R | S | T |
|---|---|---|---|---|---|---|---|
| Mesotrione (99.8%) | 11.43 | 11.43 | 11.43 | 11.43 | 11.43 | 11.43 | 11.43 |
| Pyroxasulfone (99.5%) | 4.93 | 4.93 | 4.93 | 4.93 | 4.93 | 4.93 | 4.93 |
| Epyrifenacil (98%) | 1.07 | 1.07 | 1.07 | 1.07 | 1.07 | 1.07 | 1.07 |
| Aromatic 200ND | 16.07 | 16.07 | 16.07 | 16.07 | 16.07 | 16.07 | 16.07 |
| Xiameter ® AFE 0300 | 0.2 | 0.2 | 0.2 | 0.2 | 0.2 | 0.2 | 0.2 |
| Veegum ® R | 0.25 | 0.25 | 0.25 | 0.25 | 0.25 | 0.25 | 0.25 |
| Proxel ® GXL | 0.2 | 0.2 | 0.2 | 0.2 | 0.2 | 0.2 | 0.2 |
| Propylene glycol | 5.0 | 5.0 | 5.0 | 5.0 | 5.0 | 5.0 | 5.0 |
| Atlox ® 4894 | 1.0 | 1.0 | 1.0 | 1.0 | 1.0 | 1.0 | 1.0 |
| Atlox ® 4913 | 2.0 | 2.0 | 2.0 | 2.0 | 2.0 | 2.0 | 2.0 |
| Pluronic ® L92 | 2.0 | 2.0 | 2.0 | 2.0 | 2.0 | 2.0 | 2.0 |
| Rhopodol ® 50 MC | 0.39 | — | — | — | — | — | — |
| Rhodopol ® 50 MD | — | 0.38 | — | — | — | — | — |
| Kelzan ® AP | — | — | 0.41 | — | — | — | — |
| EX-1315 | — | — | — | 0.11 | — | — | — |
| Supercol ® U | — | — | — | — | 0.29 | — | — |
| N-Hance ® HP 40S | — | — | — | — | — | 0.36 | — |
| Kelzan ® CC | — | — | — | — | — | — | 0.3 |
| Water | Q.S. | Q.S. | Q.S. | Q.S. | Q.S. | Q.S. | Q.S. |
| Total | 100 | 100 | 100 | 100 | 100 | 100 | 100 |

Rhodopol ® 50 MC (CAS # 11138-66-2) is a xanthan gum and is available from Solvay.

Rhodopol ® 50 MC has a bulk density of 750 to 850 kg/$m^3$.

Rhodopol ® 50 MD is a xanthan gum available from Solvay.

Kelzan ® AP is a xanthan gum available from CP Kelco.

Gellan gum (CAS # 71010-52-1). Gellan gum is a water-soluble anionic polysaccharide produced by *Sphingomonas elodea*.

Supercol ® U is a guar gum extracted from guar endosperm available from Hercules LLC.

N-Hance ™ HP 40 S is a hydroxypropyl guar and is available from Hercules LLC.

Kelzan ® CC is a xanthan gum available from CP Kelco.

Method

Compositions N-T from Table 9, above, were mixed and then tank mixed with a high electrolyte system, specifically RoundUp® PowerMax. Physical stability was determined by measuring amount of sediment and redispersibility following 24 hours of storage as well as ability to pass through a 100-mesh and 50-mesh screen. Results of these studies are found in Table 10, below.

TABLE 10

| Comp. | Sediment (24 hours) Ranked (Best-Worst) | Re-dispersibility (24 hours) | 100-mesh Screen | 50-mesh Screen |
|---|---|---|---|---|
| N | 5th-tied | 1/3 | Thin layer | Clean |
| O | 5th-tied | 1/6 | High Flocculation | High Flocculation |
| P | 4th | 1/2 | High Flocculation | High Flocculation |
| Q | 5th-tied | 1/3 | Low Flocculation | Very Low Flocculation |
| R | 2nd | 12/>100 | — | — |
| S | 1st | 18/>100 | — | — |
| T | 3rd | 1/5 | Medium Flocculation | Medium Flocculation |

Results

As seen in Table 10, above, Composition N, containing Rhodopol® 50 MC, provided the best stability of all compositions tested.

Example 7—Selection of Compatibilizer

TABLE 11

| Composition (% w/w) | U | V | W | X | Y | Z | AA |
|---|---|---|---|---|---|---|---|
| Mesotrione (99.8%) | 11.12 | 11.12 | 11.12 | 11.12 | 11.12 | 11.12 | 11.12 |
| Pyroxasulfone (99.5%) | 4.79 | 4.79 | 4.79 | 4.79 | 4.79 | 4.79 | 4.79 |
| Epyrifenacil (98%) | 1.07 | 1.07 | 1.07 | 1.07 | 1.07 | 1.07 | 1.07 |
| Aromatic 200ND | 16.07 | 16.07 | 16.07 | 16.07 | 16.07 | 16.07 | 16.07 |
| Xiameter ® AFE 0300 | 0.2 | 0.2 | 0.2 | 0.2 | 0.2 | 0.2 | 0.2 |
| Veegum ® R | 0.4 | 0.4 | 0.4 | 0.4 | 0.4 | 0.4 | 0.4 |
| Proxel ® GXL | 0.2 | 0.2 | 0.2 | 0.2 | 0.2 | 0.2 | 0.2 |
| Propylene glycol | 5.0 | 5.0 | 5.0 | 5.0 | 5.0 | 5.0 | 5.0 |
| Atlox ® 4894 | 1.0 | 1.0 | 1.0 | 1.0 | 1.0 | 1.0 | 1.0 |
| Atlox ® 4913 | 2.0 | 2.0 | 2.0 | 2.0 | 2.0 | 2.0 | 2.0 |
| Pluronic ® L92 | 2.0 | 2.0 | 2.0 | 2.0 | 2.0 | 2.0 | 2.0 |
| Rhopodol ® 50 MC | 0.25 | 0.25 | 0.25 | 0.25 | 0.25 | 0.25 | 0.25 |
| Atlox ® 4913 | 2.0 | 4.0 | 6.0 | 8.0 | 4.0 | 2.0 | 6.0 |
| Atlox ® 4894 | — | — | — | — | 2.0 | 4.0 | 3.0 |
| Agnique ® PG 9116 | — | — | — | — | — | — | — |
| Stepfac ™ 8181 K | — | — | — | — | — | — | — |
| Stepfac ™ 8181 PT3K | — | — | — | — | — | — | — |
| ACAR 16028 | — | — | — | — | — | — | — |
| Water | Q.S. | Q.S. | Q.S. | Q.S. | Q.S. | Q.S. | Q.S. |
| Total | 100 | 100 | 100 | 100 | 100 | 100 | 100 |

| Composition (% w/w) | AB | AC | AD | AE | AF | AG | AH |
|---|---|---|---|---|---|---|---|
| Mesotrione (99.8%) | 11.12 | 11.12 | 11.12 | 11.12 | 11.12 | 11.12 | 11.12 |
| Pyroxasulfone (99.5%) | 4.79 | 4.79 | 4.79 | 4.79 | 4.79 | 4.79 | 4.79 |
| Epyrifenacil (98%) | 1.07 | 1.07 | 1.07 | 1.07 | 1.07 | 1.07 | 1.07 |
| Aromatic 200ND | 16.07 | 16.07 | 16.07 | 16.07 | 16.07 | 16.07 | 16.07 |
| Xiameter ® AFE 0300 | 0.2 | 0.2 | 0.2 | 0.2 | 0.2 | 0.2 | 0.2 |
| Veegum ® R | 0.4 | 0.4 | 0.4 | 0.4 | 0.4 | 0.4 | 0.4 |
| Proxel ® GXL | 0.2 | 0.2 | 0.2 | 0.2 | 0.2 | 0.2 | 0.2 |
| Propylene glycol | 5.0 | 5.0 | 5.0 | 5.0 | 5.0 | 5.0 | 5.0 |
| Atlox ® 4894 | 1.0 | 1.0 | 1.0 | 1.0 | 1.0 | 1.0 | 1.0 |
| Atlox ® 4913 | 2.0 | 2.0 | 2.0 | 2.0 | 2.0 | 2.0 | 2.0 |
| Pluronic ® L92 | 2.0 | 2.0 | 2.0 | 2.0 | 2.0 | 2.0 | 2.0 |
| Rhopodol ® 50 MC | 0.25 | 0.25 | 0.25 | 0.25 | 0.25 | 0.25 | 0.25 |
| Atlox ® 4913 | — | — | — | — | — | — | — |
| Atlox ® 4894 | 6.0 | 7.0 | 8.0 | — | — | — | — |
| Agnique ® PG 9116 | — | — | — | 6.0 | — | — | — |
| Stepfac ™ 8181 K | — | — | — | — | 6.0 | — | — |
| Stepfac ™ 8181 PT3K | — | — | — | — | — | 6.0 | — |
| Agrilan ® 1028 | — | — | — | — | — | — | 6.0 |
| Water | Q.S. | Q.S. | Q.S. | Q.S. | Q.S. | Q.S. | Q.S. |
| Total | 100 | 100 | 100 | 100 | 100 | 100 | 100 |

Agnique ® PG 9116 is alkyl polyglycoside available from Cognis Corporation.

Stepfac ™ 8181 K is a potassium salt of tridecyl alcohol ethoxylate phosphate ester, POE-6 available from Stepan.

Stepfac ™ 8181 PT3K (CAS # 261627-68-3) is poly(oxy-1,2-ethanediyl), alpha-hydro-omega hydroxyl-, mono C11-14-isoalkyl ethers, C13-rich, phosphates, potassium salt available from Stepfan.

Agrilan ® 1028 (CAS # 154518-39-4) is poly(oxy-1,2-ethanediyl), .alpha.-hydro-.omega. -hydroxy-, mono (C10-rich C9-11-isoalkyl) ethers, phosphates available from Nouryon.

Method

Compositions U-AH from Table 11, above, were mixed and then tank mixed with RoundUp® PowerMax. Physical stability was determined by measuring redispersibility following 24 hours of storage. Results of these studies are found in Table 12, below.

TABLE 12

| Composition | Re-dispersibility (24 hours) |
|---|---|
| U | Poor |
| V | Poor |
| W | OK |
| X | Good |
| Y | Good |
| Z | Poor |
| AA | Excellent |
| AB | Good |
| AC | Good |
| AD | Good |
| AE | Poor |
| AF | — |
| AG | Poor |
| AH | Poor |

Results

As seen in Table 12, above, several compositions provided compatibility with a high electrolyte system. Compositions X and AB provided both good compatibility and ease of formulation and therefore were subjected to further stability studies in Example 8, below.

Example 8—Storage Stability of Select Compositions

Method

Compositions X and AB were subjected to further stability tests. Specifically, each composition was subjected to freeze/thaw cycles for 1 month, 2 weeks at 54° C., 2 months at 50° C., 4 months at 40° C. and 10 months at room temperature. Syneresis, bottom clear time, pH, sprayability, dispersibility, re-dispersibility, particle size, suspensibility and viscosity were measured prior and following each storage. Results of these studies are found in Tables 13 and 14, below.

TABLE 13

| Comp. X | Initial | 54° C. (2 w) | Freeze/Thaw (1 m) | 50° C. (2 m) | 40° C. (2 m) | 40° C. (4 m) | 25° C. (10 m) |
|---|---|---|---|---|---|---|---|
| Syneresis | 0% | 3.33% | 6.45% | 8.20% | 3.45% | 5.88% | 1.22% |
| Bottom Clear Time (s) | 1 | 1 | 1 | 1 | 1 | 1 | 2 |
| pH | 4.12 | 4.28 | 4.34 | 4.24 | 4.30 | 4.30 | 4.37 |
| Sprayability | 0.0060% | 0.0063% | 0.0065% | 0.0096% | 0.0000% | — | 0.002% |
| Dispersibility | 9 | 6 | 5 | 3 | 3 | 7 | 2 |
| Re-Dispersibility | 11/69 | 4/9 | 5/18 | 13/34 | 12/48 | 78 | 15/60 |
| D10 | 0.711 | 0.82 | 0.701 | 0.775 | 0.723 | 0.834 | 0.783 |
| D50 | 1.593 | 2.062 | 1.551 | 1.706 | 1.62 | 1.699 | 1.698 |
| D90 | 3.953 | 12.555 | 4.455 | 4.229 | 3.913 | 3.798 | 3.878 |
| Suspensibility | 97.66 | 88.41 | 92.58 | 96.27 | 95.64 | 97.68 | 111.0 |
| Viscosity at shear rate 1 $S^{-1}$ (mPa) | 2118 | 1535 | 1970 | 1370 | 1616 | 1312 | 1972 |
| Viscosity at shear rate 50 $S^{-1}$ (mPa) | 150.9 | 149.7 | 151.0 | 135.3 | 132.9 | 127.7 | 142.9 |
| G' (t = 0.1 Pa) | 8.171 | 4.025 | 5.956 | 6.013 | 6.368 | 6.048 | 6.179 |
| G'' (t = 0.1 Pa) | 4.354 | 2.945 | 3.743 | 3.306 | 3.043 | 3.162 | 3.496 |
| G'/G'' | 1.88 | 1.37 | 1.59 | 1.82 | 2.09 | 1.91 | 1.77 |

TABLE 14

| Comp. AB | Initial | 54° C. (2 w) | Freeze/Thaw (1 m) | 50° C. (2 m) | 40° C. (2 m) | 40° C. (4 m) | 25° C. (10 m) |
|---|---|---|---|---|---|---|---|
| Syneresis | 0% | 5.71% | 16.67% | 13.43% | 5.08% | 8.82% | 3.45% |
| Bottom Clear Time (s) | 2 | 1 | 1 | 1 | 1 | 1 | 2 |
| pH | 4.11 | 4.30 | 4.31 | 4.25 | 4.27 | 4.29 | 4.31 |
| Sprayability | 0.0069% | 0.0052% | 0.0076% | 0.0000% | 0.0000% | — | 0.002% |
| Dispersibility | 9 | 11 | 4 | 3 | 4 | 20 | 13 |
| Re-Dispersibility | 11/55 | 12/21 | 5/29 | 23/52 | 6/43 | 102 | 10/34 |
| D10 | 0.829 | 0.811 | 0.908 | 0.737 | 0.772 | 0.782 | 0.649 |
| D50 | 1.548 | 1.886 | 2.685 | 1.688 | 1.601 | 1.796 | 1.383 |

TABLE 14-continued

| Comp. AB | Initial | 54° C. (2 w) | Freeze/Thaw (1 m) | 50° C. (2 m) | 40° C. (2 m) | 40° C. (4 m) | 25° C. (10 m) |
|---|---|---|---|---|---|---|---|
| D90 | 3.104 | 7.209 | 8.373 | 6.53 | 4.792 | 6.732 | 3.841 |
| Suspensibility | 95.30% | 95.74% | 95.95% | 93.90% | 95.67% | 98.96% | 111.0% |
| Viscosity at shear rate 1 $S^{-1}$ (mPa) | 3548 | 2915 | 1376 | 2548 | 3066 | 2873 | 3654 |
| Viscosity at shear rate 50 $S^{-1}$ (mPa) | 234.1 | 266.2 | 196.5 | 249.5 | 258.1 | 253.5 | 276.6 |
| G' (t = 0.1 Pa) | 16.850 | 15.540 | 3.785 | 14.95 | 18.84 | 23.18 | 23.65 |
| G'' (t = 0.1 Pa) | 7.742 | 9.631 | 5.166 | 8.803 | 9.312 | 9.495 | 8.480 |
| G'/G'' | 2.18 | 1.61 | 0.73 | 1.70 | 2.02 | 2.44 | 2.79 |

As seen in Tables 13 and 14, Compositions X and AB demonstrated good physical stability.

Example 9—Chemical Stability of Select Compositions

TABLE 15

| Composition (% w/w) | AI | AJ | AK |
|---|---|---|---|
| Mesotrione (99.8%) | 11.12 | 11.12 | 11.12 |
| Pyroxasulfone (99.5%) | 4.79 | 4.79 | 4.79 |
| Epyrifenacil (98%) | 1.07 | 1.07 | 1.07 |
| Aromatic 200ND | 16.07 | 16.07 | 16.07 |
| Xiameter ® AFE 0300 | 0.2 | 0.2 | 0.2 |
| Veegum ® R | 0.4 | 0.4 | 0.4 |
| Proxel ® GXL | 0.2 | 0.2 | 0.2 |
| Propylene glycol | 5.0 | 5.0 | 5.0 |
| Atlox ® 4894 | 1.0 | 1.0 | 1.0 |
| Atlox ® 4913 | 2.0 | 2.0 | 2.0 |
| Pluronic ® L92 | 2.0 | 2.0 | 2.0 |
| Rhopodol ® 50 MC | 0.25 | 0.25 | 0.25 |
| Atlox ® 4894 | 6.0 | 6.0 | 6.0 |
| Citric Acid (40%) | 0.63% | 1.38% | 3.33% |
| Water | Q.S. | Q.S. | Q.S. |
| Total | 100 | 100 | 100 |
| pH | 3.43 | 2.98 | 2.63 |

Methods

Compositions AI, AJ and AK from Table 15, above, were subjected to 2 weeks at 54° C., 2 months at 50° C., and 2 months at 40° C. pH and degradation of epyrifenacil, mesotrione and pyroxasulfone were measured after storage. Results of these studies are found in Table 16, below.

TABLE 16

| Active | | Initial | 54° C. (2 weeks) | | 50° C. (2 months) | | 40° C. (2 months) | |
|---|---|---|---|---|---|---|---|---|
| Ingredient | Comp. | pH | pH | Assay | pH | Assay | pH | Assay |
| Epyrifenacil | AI | 3.43 | 4.04 | −0.93% | 4.06 | 0% | 4.08 | 0% |
| | AJ | 2.98 | 3.58 | 0% | 3.55 | 0% | 3.58 | 0% |
| | AK | 2.63 | 3.00 | 0% | 2.99 | — | 3.00 | 0% |
| Mesotrione | AI | 3.43 | 4.04 | −2.68% | 4.06 | −2.68% | 4.08 | −0.89% |
| | AJ | 2.98 | 3.58 | −0.89% | 3.55 | 0% | 3.58 | 0% |
| | AK | 2.63 | 3.00 | −1.77% | 2.99 | — | 3.00 | −0.89% |
| Pyroxasulfone | AI | 3.43 | 4.04 | −0.63% | 4.06 | −0.21% | 4.08 | 0.63% |
| | AJ | 2.98 | 3.58 | 0% | 3.55 | 1.26% | 3.58 | 0.84% |
| | AK | 2.63 | 3.00 | −0.24% | 2.99 | — | 3.00 | 0.21% |

Results

As seen in Table 16, above, all the compositions provided good chemical stability. Compositions AI and AJ provided both good chemical stability and less eye irritation at pH 3.5 and 3.0, respectively.

What is claimed is:

1. A stable aqueous composition comprising from about 0.5% to about 2% w/w epyrifenacil, from about 10% to about 12% w/w mesotrione, and from about 4% to about 6% w/w pyroxasulfone, a xanthan gum having a bulk density of 750 to 850 kg/$m^3$, and a surfactant consisting of an acrylic graft copolymer and an alkylphenol ethoxylate free nonionic wetter and dispersant package, wherein the surfactant is at a concentration of from about 9% to about 12% w/w and has a weight ratio of the acrylic graft copolymer to the alkylphenol ethoxylate free nonionic wetter and dispersant package of from 10:1 to 2:1 or from 1:3.5 to 1:4.5 and wherein the acrylic graft copolymer is a hydrophilic methyl methacrylate graft copolymer and wherein w/w denotes weight by total weight of the composition.

2. The composition of claim 1, wherein the composition is a suspo-emulsion.

3. The composition of claim 1, further comprising one or more solvents.

4. The composition of claim 3, wherein the one or more solvents is selected from the group consisting of heavy aromatic naphtha, a water-insoluble aromatic ester solvent, a morpholine amide of a C8,10 fatty acid and acetyl tributyl citrate.

5. The composition of claim 1, wherein the composition has a pH from about 2 to about 5.

6. A stable aqueous composition comprising from about 0.5% to about 2% w/w epyrifenacil, from about 10% to about 12% w/w mesotrione, and from about 4% to about 6% w/w pyroxasulfone, one or more solvents, one or more surfactants consisting of an acrylic graft copolymer and an alkylphenol ethoxylate free nonionic wetter and dispersant package and a xanthan gum having a bulk density of 750 to 850 kg/$m^3$, wherein the one or more surfactants is at a concentration of from about 9% to about 12% w/w and has a weight ratio of the acrylic graft copolymer to the alkylphenol ethoxylate free nonionic wetter and dispersant package of from 10:1 to 2:1 or from 1:3.5 to 1:4.5 and wherein the acrylic graft copolymer is a hydrophilic methyl methacrylate graft copolymer and wherein w/w denotes weight by total weight of the composition.

7. The stable aqueous composition of claim 6, wherein:

the one or more solvents is at a concentration from about 1% to about 30% w/w;

the xanthan gum having a bulk density of 750 to 850 kg/$m^3$ is at a concentration from about 0.01% to about 1% w/w, wherein w/w denotes weight by total weight of the composition.

8. The stable aqueous composition of claim 6, wherein:

the one or more solvents is at a concentration from about 10% to about 20% w/w;

the one or more surfactants is at a concentration from about 9% to about 15% w/w;

the xanthan gum having a bulk density of 750 to 850 kg/$m^3$ is at a concentration from about 0.1% to about 1% w/w, wherein w/w denotes weight by total weight of the composition.

9. A stable aqueous composition comprising from about 0.5% to about 2% w/w epyrifenacil, from about 10% to about 12% w/w mesotrione, and from about 4% to about 6% w/w pyroxasulfone, an alkylphenol ethoxylate free nonionic wetter and dispersant package, an acrylic graft copolymer, heavy aromatic naphtha, a poly(ethylene oxide)-poly(propylene oxide)-poly(ethylene oxide) block copolymer having an average molecular weight of 3650 and a hydrophile weight percentage of 20%, a xanthan gum having a bulk density of 750 to 850 kg/$m^3$ and water, wherein the acrylic graft copolymer to the alkylphenol ethoxylate free nonionic wetter and dispersant package are at a total concentration of from about 9% to about 12% w/w and have a weight ratio of the acrylic graft copolymer to the alkylphenol ethoxylate free nonionic wetter and dispersant package of from 10:1 to 2:1 or from 1:3.5 to 1:4.5 and wherein the acrylic graft copolymer is a hydrophilic methyl methacrylate graft copolymer and wherein w/w denotes weight by total weight of the composition.

10. The composition of claim 9, wherein:

epyrifenacil is at a concentration of about 1% w/w;

mesotrione is at a concentration of about 11% w/w;

pyroxasulfone is at a concentration of about 5% w/w;

heavy aromatic naphtha is at a concentration of about 16% w/w;

the poly(ethylene oxide)-poly(propylene oxide)-poly(ethylene oxide) block copolymer having an average molecular weight of 3650 and a hydrophile weight percentage of 20% is at a concentration of about 2% w/w;

the xanthan gum having a bulk density of 750 to 850 kg/$m^3$ is at a concentration of about 0.25% w/w; and water, wherein w/w denotes weight by total weight of the composition.

11. The composition of claim 9, further comprising a silicone-based antifoaming agent, magnesium aluminum silicate, 19.3% 1, 2-benzisothiazolin-3-one and propylene glycol.

12. The composition of claim 11, wherein:

the silicone-based antifoaming agent is at a concentration of about 0.2% w/w;

magnesium aluminum silicate is at a concentration of about 0.4% w/w;

19.3% 1, 2-benzisothiazolin-3-one is at a concentration of about 0.4% w/w; and propylene glycol is at a concentration of about 5% w/w.

13. A method of controlling a weed comprising applying the composition of claim 1 to the weed or an area in need of weed control.

14. The method of claim 13, wherein the composition of claim 1 is applied sequentially or concurrently with a compound selected from the group consisting of glyphosate, glufosinate, dicamba, 2,4-D and mixtures thereof.

* * * * *